United States Patent
Bulumulla et al.

(10) Patent No.: US 10,093,436 B2
(45) Date of Patent: Oct. 9, 2018

(54) WIRELESS AIRCRAFT ENGINE COMMUNICATION SYSTEM

(71) Applicant: General Electric Company, Schenectady, NY (US)

(72) Inventors: Selaka Bandara Bulumulla, Niskayuna, NY (US); Michael Joseph Dell'Anno, Clifton Park, NY (US); William Chester Platt, Hagaman, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 288 days.

(21) Appl. No.: 15/191,143

(22) Filed: Jun. 23, 2016

(65) Prior Publication Data

US 2017/0369189 A1    Dec. 28, 2017

(51) Int. Cl.
  *B64F 5/60*    (2017.01)
  *G07C 5/00*    (2006.01)
  (Continued)

(52) U.S. Cl.
  CPC ............. *B64F 5/60* (2017.01); *B64C 7/02* (2013.01); *B64D 29/00* (2013.01); *B64D 29/06* (2013.01);
  (Continued)

(58) Field of Classification Search
  CPC . B64D 7/02; B64D 1/36; B64D 29/00; B64D 29/06; B64D 29/08; B64D 33/00; B64D 45/00; G07C 5/008
  See application file for complete search history.

(56) References Cited

U.S. PATENT DOCUMENTS

| 2,159,379 A | 5/1939 | Hyland |
| 3,172,110 A | 3/1965 | Zieg |

(Continued)

FOREIGN PATENT DOCUMENTS

| WO | 2010/028729 A1 | 3/2010 | |
| WO | WO-2010028729 A1 * | 3/2010 | ............. F01D 25/00 |

OTHER PUBLICATIONS

International Search Report and Written Opinion issued in connection with corresponding PCT Application No. PCT/US2017/028480 dated Jul. 13, 2017.

*Primary Examiner* — Thomas G Black
*Assistant Examiner* — Sara J Lewandroski
(74) *Attorney, Agent, or Firm* — GE Global Patent Operation; Nitin Joshi

(57) ABSTRACT

An engine communication system for aircraft engines having a nacelle with two cowlings extending annularly about the aircraft engine and defining a radially outward surface thereof, and at least one sensor positioned radially inward from the nacelle. The system includes a cowling gap positioned between the two cowlings when coupled together, and an engine control device communicatively coupled to the sensor and configured to at least one of receive engine data from the sensor and receive instruction data from a transmitter device positioned radially outward from the cowling gap. The system also includes a linearly polarized antenna communicatively coupled to the engine control device and positioned radially inward from the cowling gap and extending radially outward toward the cowling gap. The antenna is configured to at least one of receive and transmit the engine data and the instruction data through the cowling gap.

20 Claims, 6 Drawing Sheets

(51) Int. Cl.
    *B64D 29/06*           (2006.01)
    *B64C 7/02*            (2006.01)
    *B64D 29/00*           (2006.01)
    *B64D 29/08*           (2006.01)
    *G05B 23/00*           (2006.01)
    *B64D 45/00*           (2006.01)

(52) U.S. Cl.
    CPC ............. *B64D 29/08* (2013.01); *G05B 23/00* (2013.01); *G07C 5/008* (2013.01); *B64D 2045/0085* (2013.01)

(56) References Cited

U.S. PATENT DOCUMENTS

| | | |
|---|---|---|
| 4,288,794 A | 9/1981 | Osborne et al. |
| 4,562,440 A | 12/1985 | Pothier |
| 5,886,671 A | 3/1999 | Riemer |
| 6,000,977 A | 12/1999 | Haake |
| 6,638,466 B1 | 10/2003 | Abbott |
| 7,595,739 B2 | 9/2009 | Ziarno |
| 8,601,823 B2 | 12/2013 | Brown |
| 9,016,697 B2 | 4/2015 | Boyd |
| 9,816,897 B2 * | 11/2017 | Ziarno .................. G01M 15/14 |
| 2005/0017876 A1 * | 1/2005 | Ziarno .................. B64D 29/00 340/945 |
| 2009/0078846 A1 | 3/2009 | Isebrand et al. |
| 2010/0049377 A1 | 2/2010 | Scheid et al. |
| 2013/0332010 A1 * | 12/2013 | Ziarno ............... G05B 23/0213 701/3 |
| 2013/0332011 A1 * | 12/2013 | Ziarno ............... G05B 23/0213 701/3 |
| 2013/0332025 A1 * | 12/2013 | Ziarno ............... G05B 23/0213 701/33.4 |
| 2014/0327577 A1 | 11/2014 | Ozaki |
| 2015/0191257 A1 * | 7/2015 | Marche .............. B64D 45/0005 415/118 |
| 2015/0252903 A1 | 9/2015 | Boyd |
| 2015/0274308 A1 * | 10/2015 | Renault .................. B64D 29/06 415/214.1 |
| 2015/0284100 A1 * | 10/2015 | Bonneau .............. B64D 29/06 415/214.1 |
| 2015/0316926 A1 | 11/2015 | Ziarno |
| 2015/0330869 A1 * | 11/2015 | Ziarno .................. G01M 15/14 701/34.4 |
| 2015/0363981 A1 * | 12/2015 | Ziarno ................. H04B 1/3822 701/101 |
| 2016/0086392 A1 | 3/2016 | Ziarno |
| 2016/0090185 A1 * | 3/2016 | Ambite Iglesias .... B64D 29/08 244/53 R |
| 2016/0207639 A1 * | 7/2016 | Ellis .................... G06Q 10/0635 |
| 2016/0260265 A1 * | 9/2016 | Buehler ................. G08C 25/00 |
| 2017/0259942 A1 * | 9/2017 | Ziarno .................. B64D 45/00 |
| 2017/0287239 A1 * | 10/2017 | Levy .................... G07C 5/0808 |

\* cited by examiner

WIRELESS AIRCRAFT ENGINE COMMUNICATION SYSTEM

BACKGROUND

The field of the disclosure relates generally to aircraft engine data communications, and more particularly, to a wireless data link to aircraft engines, including the usage of an engine-coupled linearly polarized antenna that wirelessly facilitates transmission of engine data through an opening in a nacelle.

Known aircraft engines typically are enclosed in a nacelle that protects the complex engine components from foreign objects, provides an aerodynamic fairing for the engine, and in the case of a turbofan engine, provides a flow path for engine thrust. Moreover, because the reduction of weight is crucial in aircraft and nacelle construction, many known nacelles are manufactured with aluminum or a carbon fiber-reinforced polymer material that is light-weight, durable, strong, and capable meeting the structural and functional requirements of the aircraft propulsion system. However, materials such as aluminum and carbon fiber-reinforced polymer highly attenuate radio and wireless signals, and thus, it remains difficult to wirelessly and directly convey data through these types of materials. As a result, aircraft engine maintenance crews must remove a cowling of the nacelle or use a service panel or door in order to download engine data captured by an engine control unit using a hardwired connection. This type of manual inspection and manual engine data acquisition is time consuming and expensive because of both the labor and the time needed to shut down the engine. Moreover, manual engine data acquisition poses greater risk of damage to the engine and nacelle during the engine data acquisition process. Other known aircraft engine systems use a surface-mounted antenna on the surface of the nacelle to communicate data wirelessly. However, this surface-mounted antenna on the nacelle negatively affects aerodynamic properties of the aircraft and generally requires a time consuming and costly redesign of the nacelle. Moreover, a surface-mounted antenna requires lightning protection to safeguard the low voltage antenna and radio module which adds time, complexity, and expense. Because an aircraft engine is enclosed within an aluminum or a carbon fiber constructed nacelle, any wireless signals propagated from within the nacelle are highly attenuated, leading to poor signal quality and difficulties in acquiring the engine data wirelessly from outside the nacelle.

BRIEF DESCRIPTION

In one aspect, an engine communication system for an aircraft engine is provided. The aircraft engine has a nacelle extending annularly thereabout and includes two cowlings. The nacelle defines a radially outward surface of the aircraft engine. The aircraft engine also includes at least one sensor positioned radially inward from the nacelle. The engine communication system includes a cowling gap positioned between the two cowlings when the two cowlings are coupled together. The system also includes an engine control device communicatively coupled to the at least one sensor. The engine control device is configured to at least one of receive engine data from the at least one sensor and receive instruction data from a transmitter device positioned radially outward from the cowling gap. The system further includes a linearly polarized antenna communicatively coupled to the engine control device. The linearly polarized antenna is positioned radially inward from the cowling gap and extends in a radially outward direction toward the cowling gap. The linearly polarized antenna is configured to at least one of receive the engine data from the engine control device and to transmit the engine data through the cowling gap to a receiver device positioned radially outward from the cowling gap, and receive the instruction data through the cowling gap from the transmitter device and to transmit the instruction data to the engine control device.

In another aspect, an aircraft engine is provided. The aircraft engine includes a nacelle extending annularly about the aircraft engine, where the nacelle includes two cowlings and defines a radially outward surface of the aircraft engine. The aircraft engine also includes at least one sensor positioned radially inward from the nacelle, and a cowling gap positioned between the two cowlings when the two cowlings are coupled together. The aircraft engine further includes an engine control device communicatively coupled to the at least one sensor. The engine control device is configured to at least one of receive engine data from the at least one sensor and receive instruction data from a transmitter device positioned radially outward from the cowling gap. The aircraft engine also includes a linearly polarized antenna communicatively coupled to the engine control device. The linearly polarized antenna is positioned radially inward from the cowling gap and extends in a radially outward direction toward the cowling gap. The linearly polarized antenna is configured to at least one of receive the engine data from the engine control device and to transmit the engine data through the cowling gap to a receiver device positioned radially outward from the cowling gap, and receive the instruction data through the cowling gap from the transmitter device and to transmit the instruction data to the engine control device.

In yet another aspect, an aircraft is provided. The aircraft includes an aircraft engine having a nacelle extending annularly thereabout. The nacelle includes two cowlings and defines a radially outward surface of the aircraft engine. The aircraft engine also includes at least one sensor positioned radially inward from the nacelle, and a cowling gap positioned between the two cowlings when the two cowlings are coupled together. The aircraft engine further includes an engine control device communicatively coupled to the at least one sensor. The engine control device is configured to at least one of receive engine data from the at least one sensor and receive instruction data from a transmitter device positioned radially outward from the cowling gap. The aircraft engine also includes a linearly polarized antenna communicatively coupled to the engine control device. The linearly polarized antenna is positioned radially inward from the cowling gap and extends in a radially outward direction toward the cowling gap. The linearly polarized antenna is configured to at least one of receive the engine data from the engine control device and to transmit the engine data through the cowling gap to a receiver device positioned radially outward from the cowling gap, and receive the instruction data through the cowling gap from the transmitter device and to transmit the instruction data to the engine control device.

DRAWINGS

These and other features, aspects, and advantages of the present disclosure will become better understood when the following detailed description is read with reference to the accompanying drawings in which like characters represent like parts throughout the drawings, wherein.

Figure 1:
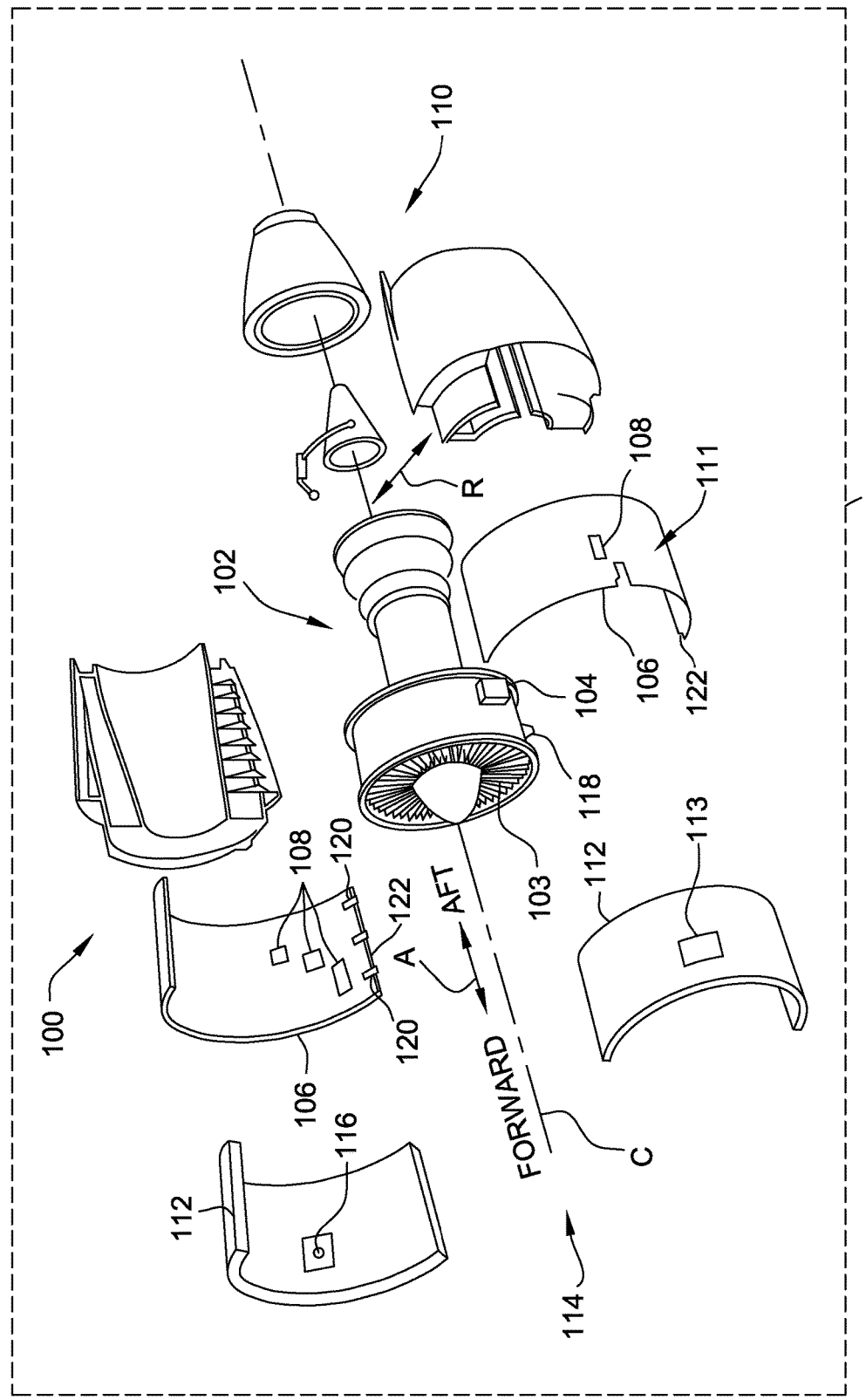
FIG. 1 is an exploded schematic diagram of an exemplary aircraft engine and a nacelle that includes at least two cowlings and an inlet housing.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations are combined and interchanged, such ranges are identified and include all the sub-ranges contained therein unless context or language indicates otherwise.

As used herein, the terms "processor" and "computer," and related terms, e.g., "processing device," "computing device," and "controller" are not limited to just those integrated circuits referred to in the art as a computer, but broadly refers to a microcontroller, a microcomputer, a programmable logic controller (PLC), and application specific integrated circuit, and other programmable circuits, and these terms are used interchangeably herein. In the embodiments described herein, memory may include, but it not limited to, a computer-readable medium, such as a random access memory (RAM), a computer-readable non-volatile medium, such as a flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner.

Furthermore, in the exemplary embodiment, additional output channels may include, but not be limited to, an operator interface monitor.

Further, as used herein, the terms "software" and "firmware" are interchangeable, and include any computer program storage in memory for execution by personal computers, workstations, clients, and servers.

As used herein, the term "non-transitory computer-readable media" is intended to be representative of any tangible computer-based device implemented in any method of technology for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including without limitation, volatile and non-volatile media, and removable and non-removable media such as firmware, physical and virtual storage, CD-ROMS, DVDs, and any other digital source such as a network or the Internet, as well as yet to be developed digital means, with the sole exception being transitory, propagating signal.

The aircraft engine communication systems described herein wirelessly facilitate, through a nacelle, the transmission of engine data that includes measurements of one or more environmental or engine conditions experienced by an engine during operation or non-operation. For example and without limitation, the one or more environmental conditions experienced by an aircraft engine include temperature, vibration, dust in intake air, chemical contamination, heat expansion, and strain of various components, such as rotary buckets, fuel lines, and other components of the engine. Additionally, the monitoring system measures and records aspects of engine performance, such as thrust, air intake, and fuel efficiency. These measurements are stored as engine data for later use and assist maintenance crews and engineers in identifying repairs and other maintenance activities that need to be performed on an aircraft engine (e.g., a component of an aircraft engine from which an abnormal amount of vibration was detected during flight). As described herein, "engine data" may refer to not only environmental condition measurements but also, for example and without limitation, engine manufacturer, model, or any other specifications such as serial number, relating to the engine. Furthermore, the aircraft engine communication system described herein additionally wirelessly facilitates, through the nacelle, the transmission of engine control unit software updates. Further, the aircraft engine communication systems described herein facilitate receiving, through a cowling gap, instructions from an operator or associated system about which engine parameters and/or environmental conditions to save. For example, prior to flight use of the aircraft engine, an antenna coupled to the engine control device receives, through the cowling gap, instructions for the scheduled flight. The engine control device will save these parameters during flight and at the end of the flight, i.e., when the aircraft is on the ground, and the data associated with these parameters is transmitted to the user through the antenna and the cowling gap. For example, engine data is transmitted through the cowling gap to a WLAN access point or to a cellular network tower. Similarly, the antenna enables wireless receipt of user-initiated software updates for the engine control device, the engine communications system, and associated systems.

The engine communication system described herein advantageously includes a linearly polarized antenna that wirelessly transmits engine data collected from an engine control unit through a cowling seam of the nacelle. In particular, the linearly polarized antenna is positioned equidistant between two fasteners that couple two cowlings of the nacelle together. The linearly polarized antenna is oriented relative to the cowling seam such that the electric field of the propagated wave signal is perpendicular to the cowling seam. Moreover, the linearly polarized antenna facilitates the transmission of engine data from the engine control device from within the nacelle to a receiver host without a technician having to open the nacelle or to physically access the engine through a service door. This configuration reduces the amount of time and resources expended in aircraft engine maintenance because engine data and instruction data may be quickly and efficiently downloaded and transmitted through the use of a mobile device that is proximate the nacelle. Alternatively, the engine data may also be downloaded through the use of a cellular network or other ground based wireless communication system, such as WiFi. Therefore, the integration of the linearly polarized antenna coupled to the aircraft engine allows for more robust, cheaper, and faster engine data acquisition.

FIG. 1 is an exploded schematic view of an engine communication system 100 that includes an engine 102 coupled to an engine control device 104 including, for example and without limitation, a sensor monitoring unit, a controller, or any other similar device, enclosed within a nacelle 110. In the exemplary embodiment, engine 102 is embodied in an aircraft engine for an aircraft 101. Engine 102 includes a centerline C defining forward and aft axial directions A. Alternatively, engine 102 is any other turbomachine, including, without limitation, a steam turbine engine, a wind turbine, and a compressor. In the exemplary embodiment, engine 102 and various components thereof are enclosed inside nacelle 110, which extends annularly (i.e., circumferentially) about engine 102. Thus, an exterior surface of nacelle 110 defines a radially outward-most surface 111 (i.e., boundary) of engine 102, where substantially all components of engine 102 and engine communication system 100 are positioned radially inward from nacelle 110 to centerline C in a radial direction R. A forward portion of nacelle 110 and an inlet housing 112 defines an air inlet flowpath 114 for a fan module 103. Inlet housing 112 also contains one or more service doors 113 and one or more inlet sensors 116 (e.g., at least one of temperature sensor and a pressure sensor) positioned under the one or more service doors 113. In the exemplary embodiment, engine 102 also includes a compressor section (not shown) coupled downstream from (i.e., aft), and in flow communication with fan module 103.

Also, in the exemplary embodiment, nacelle 110 includes an antenna enclosure 118 that is coupled to engine 102, as shown in FIG. 1, or alternatively, is coupled to engine control device 104 or nacelle 110. Moreover, nacelle 110 includes at least two cowlings 106 that have one or more additional service doors 108 that may include, for example and without limitation, a sensor panel door, oil door, pressure release door, or any other type of door generally situated within nacelle 110. The at least two cowlings 106 thus form nacelle 110 which extends annularly about engine 102. Moreover, each cowling 106 includes a plurality of fasteners 120, such as and without limitation, latches, hooks, bolts, and clamps. Using fasteners 120, each cowling 106 is coupled to the complementary cowling 106 in preparation for flight or other operational state. When the two cowlings 106 are fastened together, a cowling gap remains between each edge 122 of the two cowlings 106.

Figure 2:
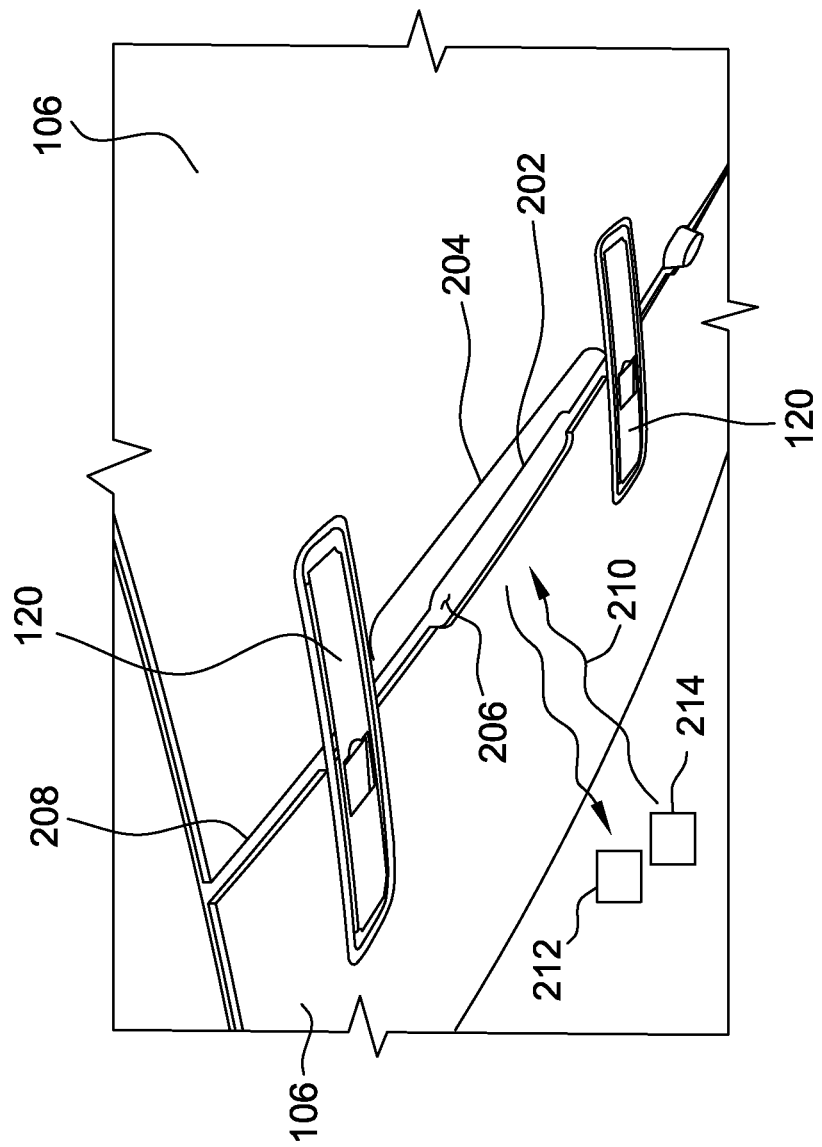
FIG. 2 is a schematic exterior view of a cowling gap formed by the two cowlings of the nacelle shown in FIG. 1.
Figure 3:
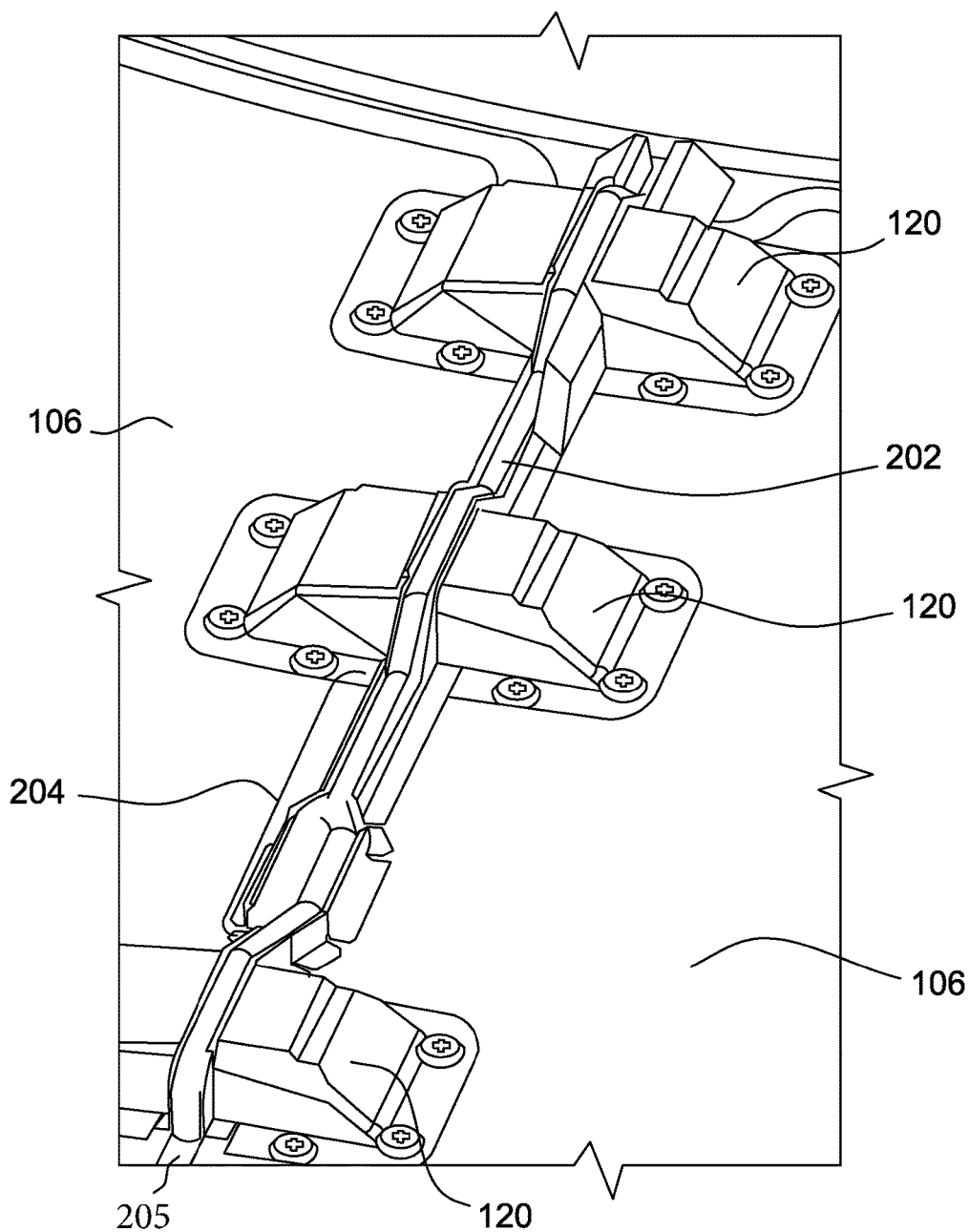
FIG. 3 is a schematic interior view the cowling gap formed by the two cowlings of the nacelle shown in FIG. 1.

FIGS. 2 and 3 are a schematic exterior view and a schematic interior view, respectively, of a cowling seam 202 defined by a cowling gap 208 of two cowlings 106 of nacelle 110. This cowling gap 208 may be filled with a seam material, such as and without limitation, an elastomer that is coupled to edge 122 of cowling 106. The elastomer encloses engine 102 within nacelle 110 when cowlings 106 are fastened together and is substantially transparent to electromagnetic waves, such as radio and wireless signals. Cowling seam 202 includes a seam length 204 that is a length that runs between two fasteners 120 and includes a seam width 205 that is substantially the width of cowling gap 208. Because fasteners 120 are generally constructed from metal and other highly attenuating materials, engine communication system 100 uses seam length 204 between fasteners 120 of cowling seam 202 to at least one of propagate (i.e., transmit) and receive an electromagnetic signal 210 through cowling gap 208 to and from a receiver device 212 and a transmitter device 214, respectively, positioned radially outward from the cowling gap 208.

For example, and without limitation, cowlings 106 generally have seam lengths 204 ranging from 40 centimeters (cm) to 50 cm that reside between fasteners 120. However, seam lengths 204 may be of any length that enables operation of engine communication system 100 as described herein. Likewise, seam widths 205 may be of any width, but for example and without limitation, generally range from 0.5 cm to 2.5 cm. In some embodiments, both of the two cowlings 106 have a corresponding cowling seam 202 such that, when the two cowlings 106 are fastened together, the two cowling seams 202 exhibit the same properties as a single cowling seam 202. In some embodiments, joints or service doors embedded in nacelle 110 may also be used to facilitate transmission and receipt of wireless signals through nacelle 110.

Figure 4:
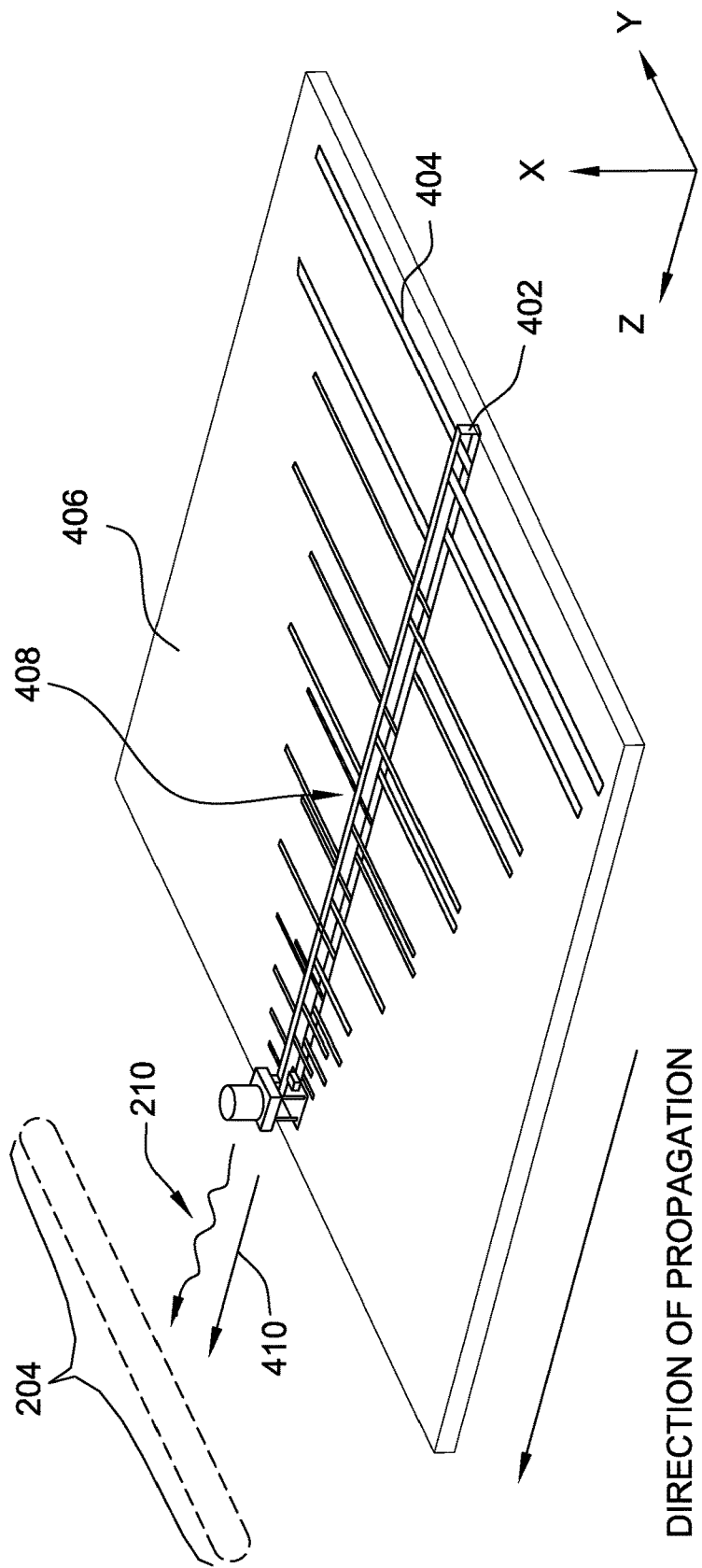
FIG. 4 is a schematic perspective view of an exemplary linearly polarized antenna embedded within a substrate.

FIG. 4 is a schematic perspective view of an exemplary linearly polarized antenna 402 embedded within a substrate board 406 that is housed in the antenna enclosure 118 shown in FIG. 1. Linearly polarized antenna 402 is a directional, multi-element antenna designed to operate over a wide band of frequencies and, in some embodiments, a free-form antenna that is not in a substrate. In some embodiments, linearly polarized antenna 402 is a logarithmic periodic dipole antenna (i.e., a log-periodic antenna) that includes a plurality of half-wave dipole arms 404. Moreover, each arm 404 is attached in pairs to a feedline 408 of the logarithmic periodic dipole antenna while gradually increasing in length along feedline 408. Each pair of dipole arms 404 are keyed to a particular frequency and may resonate feedline 408 accordingly. While linearly polarized antenna 402 propagates waves in the z direction, as shown in FIG. 4, linearly polarized antenna 402 may be oriented (or rotated about the z axis) in such a manner that the polarization or electric field is perpendicular to cowling seam 202 (shown in FIGS. 2 and 3) or cowling gap 208. Advantageously, with linearly polarized antenna 402 oriented in this configuration (i.e., an electric field vector 410 of the propagated electromagnetic signal 210 being perpendicular to seam length 204 of cowling gap 208), electromagnetic signal 210 experiences substantially less attenuation while passing through cowling seam 202 relative to a configuration in which the electric field ran parallel to cowling gap 208.

Figure 5:
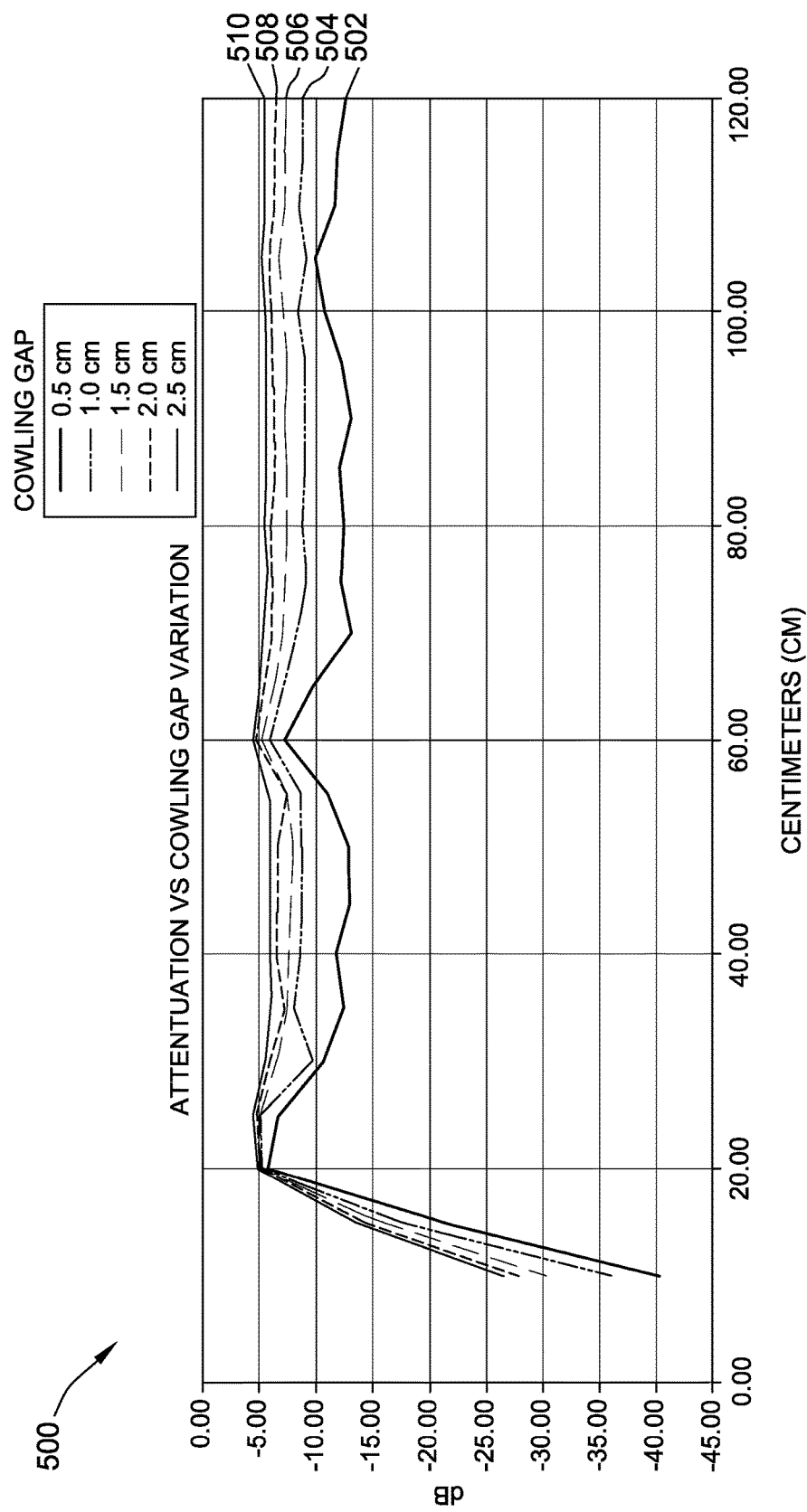
FIG. 5 is a graphical view of exemplary signal attenuation for a linearly polarized waveform at different cowling gap distances and different cowling gap lengths for the linearly polarized antenna shown in FIG. 4.

FIG. 5 is a graphical view of exemplary signal attenuation for a 700 MHz linearly polarized waveform at five different cowling gap distances 206 (shown in FIGS. 2 and 3) and at different cowling seam lengths 204 for the linearly polarized antenna 402 (shown in FIG. 4). FIG. 5 includes a slot dimension signal attenuation graph 500 that includes a y-axis defining a linear representation of signal attenuation gain or power in decibels (dB) from −45 dB to 0 dB. Graph 500 also includes an x-axis defining a linear representation of seam length 204 (shown in FIGS. 2 and 3) from 0.0 (zero) cm to 120.0 cm. Additionally, graph 500 includes five signal attenuation vs. seam length 204 curves for five different cowling gap distance 206 variations between two cowlings 106 of nacelle 110 (both shown in FIG. 1). The lowermost curve is a 0.5 cm cowling gap curve 502 that represents the signal attenuation response at different seam lengths when the cowling gap distance 206 is approximately 0.5 cm. The second lowermost curve is a 1.0 cm cowling gap curve 504 that represents the signal attenuation response at different seam lengths when cowling gap distance 206 is approximately 1.0 cm. The third lowermost curve is a 1.5 cm cowling gap curve 506 that represents the signal attenuation response at different seam lengths when cowling gap distance 206 is approximately 1.5 cm. The second uppermost curve is a 2.0 cm cowling gap curve 508 that represents the signal attenuation response at different seam lengths when cowling gap distance 206 is approximately 2.0 cm. The uppermost curve is a 2.5 cm cowling gap curve 510 that represents the signal attenuation response at different seam lengths when cowling gap distance 206 is approximately 2.5 cm. As shown in FIG. 5, a cowling gap distance 206 of 2.5 cm provides for lower signal attenuation across a greater range of seam lengths than narrower cowling gap 208 distances depicted in curves 502-508. Furthermore, seam lengths 204 greater than 20 cm provide much less signal attenuation than seam lengths 204 less than 20 cm.

Figure 6:
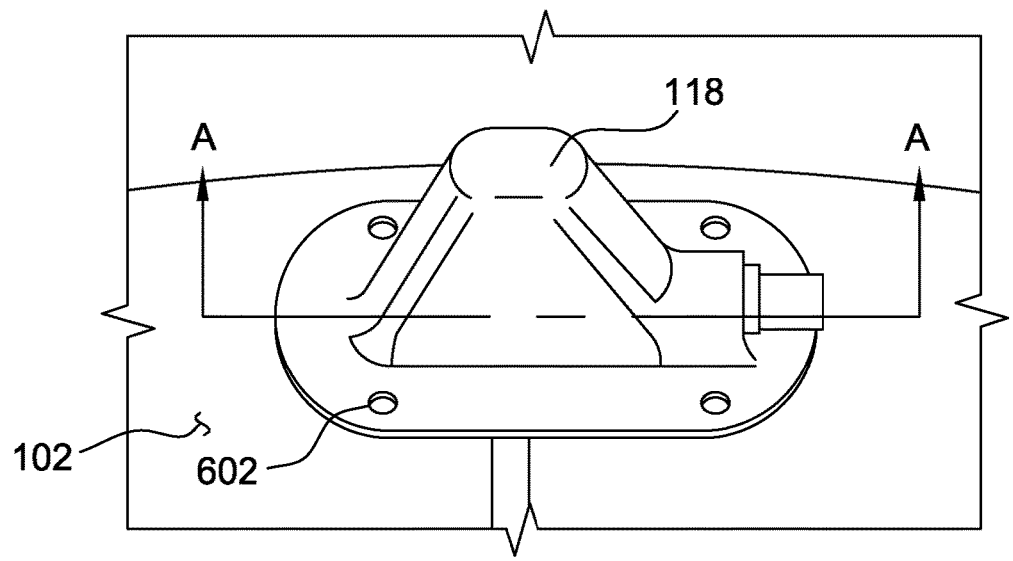
FIG. 6 is a schematic perspective view of an exemplary antenna enclosure shown in FIG. 1.

FIG. 6 is a schematic perspective view of an exemplary antenna enclosure 118 coupled to engine 102. Antenna enclosure 118 is constructed from, for example and without limitation, fiberglass, plastic (e.g., polycarbonate, acrylic), Teflon™, laminate, or any other suitable radio frequency transparent material. Antenna enclosure 118 provides protection for linearly polarized antenna 402 (shown in FIG. 4) and can draw heat away from linearly polarized antenna 402. Generally, antenna enclosure 118 is mounted directly on engine 102 using fastener holes 602, but alternatively, may also be coupled to engine control device 104 or other support structures (e.g., a pylon, not shown) within nacelle 110. Antenna enclosure 118 also protects linearly polarized antenna 402 from physical damage and degradation. Environmental conditions such as precipitation, dust, chemical (e.g., oil and gas) exposure, and heat may induce physical damage and degradation to the components of linearly polarized antenna 402.

Figure 7:
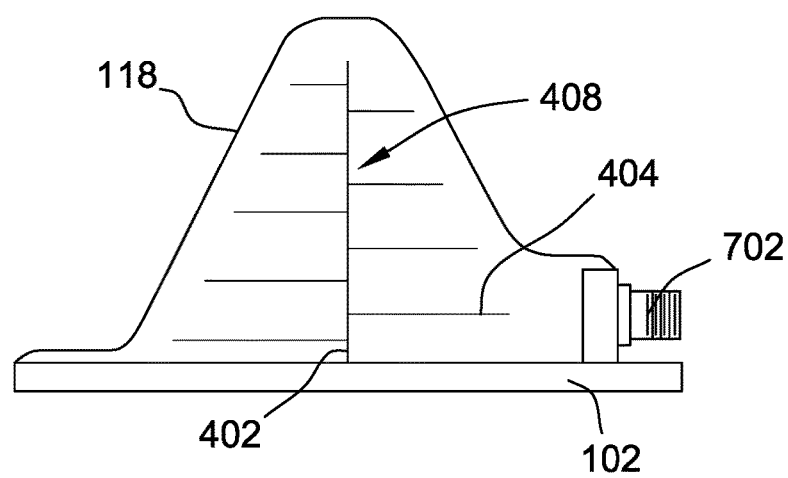
FIG. 7 is a cross-sectional view of a portion of the antenna enclosure shown in FIG. 6.

FIG. 7 is a cross-sectional view of a portion of antenna enclosure 118 as shown along line "A-A" (shown in FIG. 6). As previously discussed, antenna enclosure 118 includes fastener holes 602 to attach antenna enclosure 118 to engine 102. Moreover, as discussed above, antenna enclosure 118 encloses and protects linearly polarized antenna 402 and is constructed from any number of composites, aluminum, or carbon fiber. Furthermore, antenna enclosure 118 includes linearly polarized antenna 402 that may be, for example and without limitation, a free-form, stand-alone antenna or a printed or otherwise embedded antenna within a substrate, such a printed circuit board that facilitates transmission and reception of wireless signals. The top or surface area of antenna enclosure 118 is also advantageously shaped or molded to seamlessly fit the shape of linearly polarized antenna 402. In this manner, the shaped form of the surface of antenna enclosure 118 uses less material and may be located in more precise locations on engine 102. Because antenna placement is critical in minimizing signal attenuation, a smaller sized antenna enclosure 118 allows a designer to more precisely locate linearly polarized antenna 402 to produce the least amount of signal attenuation.

The above described aircraft engine communication systems wirelessly facilitate, through a nacelle, the transmission of engine data that includes measurements of one or more environmental or engine conditions experienced by an engine during operation or non-operation. For example and without limitation, the one or more environmental conditions experienced by an aircraft engine include temperature, vibration, dust in intake air, chemical contamination, heat expansion, and strain of various components, such as rotary buckets, fuel lines, and other components of the engine. Additionally, the monitoring system measures and records aspects of engine performance, such thrust, air intake, and fuel efficiency. These measurements assist maintenance crews and engineers in identifying repairs and other maintenance activities that need to be performed on an aircraft engine. These measurements of environmental and engine conditions are stored as engine data for later use. As described herein, "engine data" may refer to not only environmental condition measurements but also, for example and without limitation, engine manufacturer, model, or any other specifications such as serial number, relating to the engine. Furthermore, the aircraft engine communication system described herein additionally facilitates wireless transmission, through the nacelle, of engine control device software updates.

The system described herein advantageously includes a linearly polarized antenna that wirelessly transmits engine data collected from an engine control unit through a cowling seam of the nacelle. In particular, the linearly polarized antenna is positioned equidistant between two fasteners that couple two cowlings of the nacelle together. The linearly polarized antenna is oriented relative to the cowling seam such that the electric field of the propagated wave signal is perpendicular to the cowling seam. Moreover, the linearly polarized antenna facilitates the transmission of engine data from the engine control device from within the nacelle to a receiver host without a technician having to open the nacelle or to physically access the engine through a service door. This configuration reduces the amount of time and resources expended in aircraft engine maintenance because engine data and instruction data may be quickly and efficiently downloaded and transmitted through the use of a mobile device that is proximate the nacelle. Alternatively, the engine data may also be downloaded through the use of a cellular network or other ground based wireless communication system, such as WiFi. Therefore, the integration of the linearly polarized antenna coupled to the aircraft engine allows for more robust, cheaper, and faster engine data acquisition.

An exemplary technical effect of the methods, systems, and apparatus described herein includes at least one of: (a) wirelessly facilitating transmission of environmental condition data and engine data, for example and without limitation, temperature, vibration, heat expansion, strain, chemical contamination, thrust, air intake, and fuel efficiency for an aircraft engine without physical inspection of a nacelle enclosure; (b) enabling the measurement of environmental and engine conditions regardless the material of which the nacelle is constructed; (c) enabling more frequent and cheaper inspection of the aircraft engine which potentially decreases the frequency of maintenance and improves the service life of the aircraft engine; and (d) enabling reliability or other computer models of engines, including a collection of models for each and every engine based on serial number, enabling update of models in substantially real time, and with wirelessly-acquired environmental condition and engine data specific to each and every engine, further enabling prediction of condition and maintenance needs of each and every engine.

Exemplary embodiments of a monitoring system are described above in detail. The monitoring system and methods of manufacturing or operating such a system and device are not limited to the specific embodiments described herein, but rather, components of systems and/or steps of the methods may be utilized independently and separately from other components and/or steps described herein. For example, the systems, apparatus, and methods may also be used in combination with other types of machines enclosed with materials that highly attenuated wireless signals, and are not limited to practice with only the monitoring system described herein. Rather, the exemplary embodiment can be implemented and utilized in connection with many other applications, equipment, and systems that may benefit from using antenna embedded composite panels.

Although specific features of various embodiments of the disclosure may be shown in some drawings and not in others, this is for convenience only. In accordance with the principles of the disclosure, any feature of a drawing may be referenced and claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An engine communication system for an aircraft engine, the aircraft engine having a nacelle extending annularly thereabout and including two cowlings, the nacelle defining a radially outward surface of the aircraft engine, the aircraft engine further including at least one sensor positioned radially inward from the nacelle, said system comprising:
   a cowling gap positioned between the two cowlings when the two cowlings are coupled together;
   an engine control device communicatively coupled to the at least one sensor, said engine control device configured to at least one of receive engine data from the at least one sensor and receive instruction data from a transmitter device positioned radially outward from said cowling gap; and
   a linearly polarized antenna communicatively coupled to said engine control device, said linearly polarized antenna positioned radially inward from said cowling gap and extending in a radially outward direction toward said cowling gap, wherein said linearly polarized antenna is configured to at least one of:
      receive the engine data from said engine control device and to transmit the engine data through said cowling gap to a receiver device positioned radially outward from said cowling gap; and
      receive the instruction data through said cowling gap from the transmitter device and to transmit the instruction data to said engine control device.

2. The engine communication system in accordance with claim 1, wherein the two cowlings are coupled together using a plurality of fasteners, and wherein said linearly polarized antenna is further positioned equidistant from each fastener of said plurality of fasteners.

3. The engine communication system in accordance with claim 1, wherein said linearly polarized antenna is further configured to propagate an electromagnetic signal, and wherein said linearly polarized antenna is further positioned such that an electric field vector of the electromagnetic signal is perpendicular to a length of said cowling gap.

4. The engine communication system in accordance with claim 3, wherein the length of said cowling gap is longer than twenty (20) centimeters.

5. The engine communication system in accordance with claim 1, wherein said linearly polarized antenna is further configured to propagate an electromagnetic signal, and wherein said cowling gap comprises a material that is substantially transparent to the electromagnetic signal.

6. The engine communication system in accordance with claim 1, wherein the engine data includes information pertaining to operation of the aircraft engine including at least one of during flight service and during ground service.

7. The engine communication system in accordance with claim 6, wherein the engine data includes diagnostic data related to repair and maintenance, the diagnostic data including at least one of serial number, operating environmental conditions, and information configured to generate at least one engine-specific computer model maintained in a data storage and analysis center to facilitate predicting repair and maintenance requirements of the aircraft engine.

8. The engine communication system in accordance with claim 1, wherein said linearly polarized antenna comprises a logarithmic periodic dipole antenna.

9. The engine communication system in accordance with claim 1, wherein said linearly polarized antenna is further configured to at least one of transmit and receive at least one of the engine data and the instruction data using a wireless communication protocol including at least one of WiFi, cellular, WiMax™, Bluetooth™, and a wireless local area network (WLAN).

10. The engine communication system in accordance with claim 1, wherein said linearly polarized antenna is further configured to at least one of transmit and receive at least one of the engine data and the instruction data over a predetermined range of a plurality of frequencies.

11. An aircraft engine comprising:
a nacelle extending annularly about said aircraft engine, said nacelle comprising two cowlings and defining a radially outward surface of said aircraft engine;
at least one sensor positioned radially inward from said nacelle;
a cowling gap positioned between said two cowlings when said two cowlings are coupled together;
an engine control device communicatively coupled to said at least one sensor, said engine control device configured to at least one of receive engine data from said at least one sensor and receive instruction data from a transmitter device positioned radially outward from said cowling gap; and
a linearly polarized antenna communicatively coupled to said engine control device, said linearly polarized antenna positioned radially inward from said cowling gap and extending in a radially outward direction toward said cowling gap, wherein said linearly polarized antenna is configured to at least one of:
receive the engine data from said engine control device and to transmit the engine data through said cowling gap to a receiver device positioned radially outward from said cowling gap; and
receive the instruction data through said cowling gap from the transmitter device and to transmit the instruction data to said engine control device.

12. The aircraft engine in accordance with claim 11, wherein said two cowlings are coupled together using a plurality of fasteners, and wherein said linearly polarized antenna is further positioned equidistant from each fastener of said plurality of fasteners.

13. The aircraft engine in accordance with claim 11, wherein said linearly polarized antenna is further configured to propagate an electromagnetic signal, and wherein said linearly polarized antenna is further positioned such that an electric field vector of the electromagnetic signal is perpendicular to a length of said cowling gap.

14. The aircraft engine in accordance with claim 13, wherein the length of said cowling gap is longer than twenty (20) centimeters.

15. The aircraft engine in accordance with claim 11, wherein said linearly polarized antenna is further configured to propagate an electromagnetic signal, and wherein said cowling gap comprises a material that is substantially transparent to the electromagnetic signal.

16. The aircraft engine in accordance with claim 11, wherein the engine data includes information pertaining to operation of the aircraft engine including at least one of during flight service and during ground service.

17. The aircraft engine in accordance with claim 16, wherein the engine data includes diagnostic data related to repair and maintenance, the diagnostic data including at least one of serial number, operating environmental conditions, and information configured to generate at least one engine-specific computer model maintained in a data storage and analysis center to facilitate predicting repair and maintenance requirements of said aircraft engine.

18. The aircraft engine in accordance with claim 11, wherein said linearly polarized antenna comprises a logarithmic periodic dipole antenna.

19. The aircraft engine in accordance with claim 11, wherein said linearly polarized antenna is further configured to at least one of transmit and receive at least one of the engine data and the instruction data over a predetermined range of a plurality of frequencies.

20. An aircraft comprising:
an aircraft engine comprising:
a nacelle extending annularly about said aircraft engine, said nacelle comprising two cowlings and defining a radially outward surface of said aircraft engine;
at least one sensor positioned radially inward from said nacelle;
a cowling gap positioned between said two cowlings when said two cowlings are coupled together;
an engine control device communicatively coupled to said at least one sensor, said engine control device configured to at least one of receive engine data from said at least one sensor and receive instruction data from a transmitter device positioned radially outward from said cowling gap; and
a linearly polarized antenna communicatively coupled to said engine control device, said linearly polarized antenna positioned radially inward from said cowling gap and extending in a radially outward direction toward said cowling gap, wherein said linearly polarized antenna is configured to at least one of:
receive the engine data from said engine control device and to transmit the engine data through said cowling gap to a receiver device positioned radially outward from said cowling gap; and
receive the instruction data through said cowling gap from the transmitter device and to transmit the instruction data to said engine control device.

* * * * *